United States Patent [19]

Felsberg et al.

[11] 3,825,843

[45] July 23, 1974

[54] SELECTIVE DISTORTION COMPENSATION CIRCUIT

[75] Inventors: Robert Irving Felsberg; Hotze Miedema, both of Boxford, Mass.

[73] Assignee: Bell Telephone Laboratories, Inc., Murray Hill, N.J.

[22] Filed: June 8, 1973

[21] Appl. No.: 368,110

[52] U.S. Cl. .................. 328/163, 330/149, 330/151

[51] Int. Cl. ............................................ H03b 1/04

[58] Field of Search ............ 330/149, 151; 328/143, 328/144, 163; 325/475, 476; 332/18, 37 R; 333/28 R

[56] References Cited

UNITED STATES PATENTS 3,231,819 1/1966 Aaron ............................ 330/149 X

*Primary Examiner*—Herman Karl Saalbach
*Assistant Examiner*—James B. Mullins
*Attorney, Agent, or Firm*—John K. Mullarney; John Francis Moran

[57] ABSTRACT

Nonlinear distortion in the transmission signal of a signal path is selectively compensated by the introduction of a distortion cancelling signal. A compensation circuit utilizes a portion of the transmission signal to generate the signal used in cancelling the distortion. In one embodiment of the compensation circuit, a squarer and a multiplier serve to produce a third order distortion cancelling signal. This distortion cancelling signal is then coupled to the signal path with its phase and amplitude individually adjusted to cause cancellation of the nonlinear distortion in the signal path. In an alternate embodiment of the compensation circuit, a balanced arrangement eliminates feedthrough of the transmission signal through the compensation circuit.

5 Claims, 8 Drawing Figures

SELECTIVE DISTORTION COMPENSATION CIRCUIT

BACKGROUND OF THE INVENTION

This invention relates to signal transmission systems and, more particularly, to arrangements in which distortion produced by nonlinearities in the operation of an active device is substantially eliminated through the introduction of a compensating, distortion cancelling signal.

Predistortion and postdistortion techniques for cancelling the distortion introduced by the nonlinear transfer characteristics of active devices, such as an amplifier, are well known. In a typical prior art arrangement, as disclosed in U.S. Pat. No. 3,383,618 issued to R. S. Engelbrecht on May 14, 1968, a "nonlinear device" in a compensation circuit is driven by a portion of the output signal of an amplifier. The nonlinear device generates a composite signal containing a host of distortion components covering a range of multiple orders of distortion. All of these distortion components pass through two controllers, one for phase and the other for amplitude, before they are coupled with the output signal of the amplifier to provide a reduction in overall signal distortion through complementary cancellation. In the above and other known arrangements, those in the art have had to adjust the phase and amplitude of all of the distortion components as a single composite signal to eliminate the third order distortion and thereby obtain an overall reduction in signal distortion.

The third order distortion is typically the largest and most troublesome of the orders of distortion generated by the nonlinear operation of an active device. The higher orders of distortion (that is, greater than the third) present in the output signal of an uncompensated amplifier, for example, are usually in themselves small, but the higher order distortion components present in the output of the nonlinear device used to compensate the amplifier have a different phase and amplitude than the higher orders of distortion in the output of the amplifier. These differences are due to unavoidable minute deviations between the characteristics of the compensating nonlinear device and the amplifier. Therefore, when these two outputs are combined, the third order distortion may be reduced, but the higher orders of distortion are typically magnified. This disadvantageous compromise renders the prior art distortion compensation techniques ineffective in numerous applications. Such compensation techniques are particularly inadequate for use in analog transmission systems which employ, in tandem, numerous repeater amplifiers in the transmission path.

Accordingly, it is an object of this invention to reduce a selective order of distortion without an increase in other orders of distortion.

More specifically, it is an object of this invention to compensate for the effects of all third order distortion components throughout the dynamic range and frequency bandwidth of an amplifier.

SUMMARY OF THE INVENTION

In an illustrative embodiment of the invention, third order distortion in a signal path is substantially eliminated without a detrimental increase in higher orders of distortion. A portion of the signal in the signal path is extracted and applied to a squarer and a multiplier. The squarer and multiplier comprise a compensation circuit. The squarer operates on its input signal to produce a second order output signal. In the multiplier, the second order output signal and the other input signal thereto are multiplied together to produce a third order output signal. The phase and amplitude of the third order signal are adjusted to provide a compensating signal. This compensating signal is then coupled to the signal path so that the third order distortion produced in the signal path is substantially eliminated through complementary cancellation.

In a preferred illustrative embodiment of the invention, the compensation circuit comprises a squarer which supplies a second order output signal to two multipliers operating in a balanced configuration. A portion of the signal in the signal path is also applied to the two multipliers. The third order output signals from the two multipliers are then combined to provide a single third order output signal. Because of the balanced configuration, those portions of the input signal which feed through the multipliers and appear in their individual outputs cancel each other out when the two outputs are combined to form one signal.

It is a feature of the present invention that the compensation circuit produces a distortion cancelling signal corresponding solely to the third order distortion introduced by the nonlinearities in the operation of an active device.

BRIEF DESCRIPTION OF THE DRAWINGS

These and other objects and features of the invention will be better understood by reference to the following detailed description when considered in conjunction with the accompanying drawings in which.

DETAILED DESCRIPTION

Figure 1A:
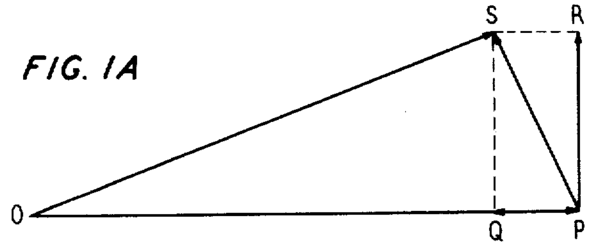
FIGS. 1A and 1B are vector diagrams of distortion produced by nonlinear operation of an active device.
Figure 1B:
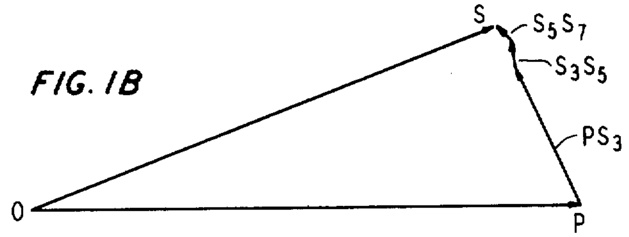

Referring now to the drawings, FIGS. 1A and 1B are vector diagrams which illustrate the phase and amplitude distortion produced by nonlinearities in the operation of an active device. In most all nonlinear devices there are two kinds of distortion. Amplitude dependent gain/loss is the first kind and the other is AM/PM conversion. The AM/PM conversion is produced by a partial conversion of the amplitude modulation of the input signal to an active device to some phase modulation of the output signal. This is a result of the phase shift (or delay) of the active device being dependent upon the instantaneous amplitude of the signal. Active devices, such as traveling wave tubes, have a phase shift that is dependent upon the amplitude of the input signal and accordingly convert amplitude modulation to phase modulation. Effective distortion compensation of such devices requires cancellation of both kinds of distortion.

When a sinusoidal signal is passing through a nonlinear device, the output signal spectrum of this device will contain not only the fundamental frequency of the signal, but also many of its harmonics. The output signal at the fundamental frequency can be broken down into a number of components. These components are shown in the vector diagram of FIG. 1A, where the vector OS represents the distorted output signal at the fundamental frequency. As can be seen, the distorted signal OS is a summation of three vectors. The first and largest component of OS is vector OP, which represents the undistorted signal. Superimposed on vector OP is vector PQ, which represents the amplitude distortion. Shifted ninety degrees, or in quadrature, to the amplitude distortion PQ is the phase distortion PR. The total distortion is represented by vector PS.

Both PQ and PR can be expressed in the form of a power series of the amplitude of the input signal. For a sinusoidal input signal of amplitude $V_i$, the distortion produced by a typical active device of the fundamental frequency of the input signal can be represented as:

$$PQ = a_3V_i^3 + a_5V_i^5 + \quad (1)$$
$$PR = b_3V_i^3 + b_5V_i^5 + \quad (2)$$

The coefficients (that is, $a_n$ and $b_n$) are constants determined by the particular characteristics of the active device. In the power series, linear terms are not included since they do not contribute to the distortion. Likewise, even order terms are not included because they do not contribute to the distortion at the fundamental frequency.

The total distortion, which is the vector sum of PQ and PR, can be expressed as $$\overline{PS} = \overline{V_i^3 \sqrt{(a_3^2 + b_3^2)}} + \overline{V_i^5 \sqrt{(a_5^2 + b_5^2)}} + \quad (3)$$

where the overbar indicates a vector. If we show this in a vector diagram we obtain FIG. 1B, where:

$$\overline{PS} = \overline{PS_3} + \overline{S_3S_5} + \quad (4)$$

The total distortion $\overline{PS}$ introduced by the active device comprises a third order component $\overline{PS_3}$, a fifth order component $\overline{S_3S_5}$, and so on. These various orders of distortion are each shifted in phase by fixed phase angles from the output signal OP. As indicated in FIG. 1B, most of the distortion introduced comprises the third order distortion component $\overline{PS_3}$. This is most particularly true of such active devices as traveling wave tubes. Elimination of third order distortion therefore provides substantial distortion compensation. Complete elimination of third order distortion, including both phase and amplitude distortion, requires a compensating signal which maintains a constant complementary phase relationship with the third order distortion of the active device throughout the frequency bandwidth and dynamic range of the latter. Prior art compensation techniques have not been effective in maintaining a constant complementary phase relationship between the third order distortion and the compensating signal, which is necessary to compensate for both phase and amplitude distortion.

Figure 2:
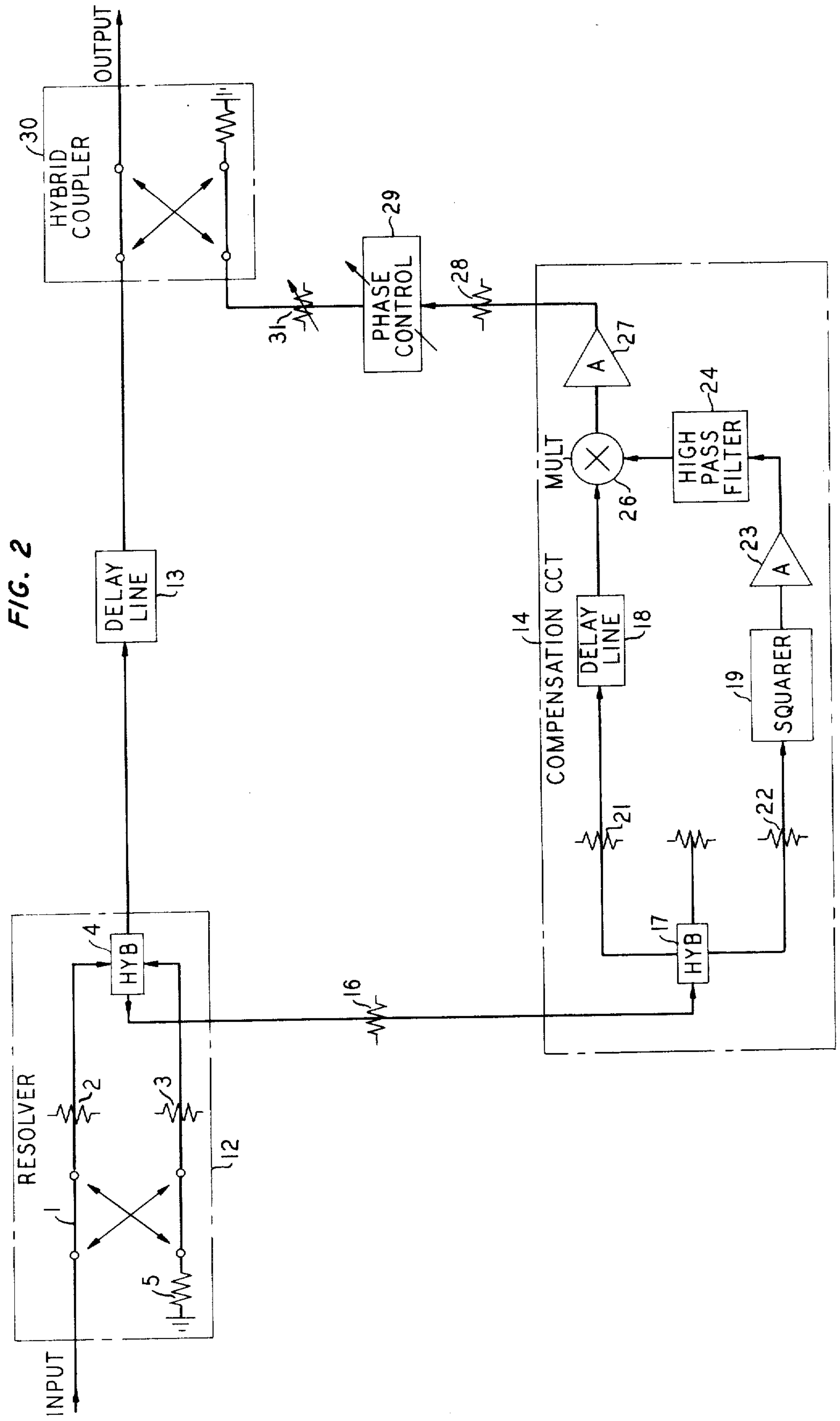
FIG. 2 is a distortion compensation circuit for an active device in accordance with the invention.

FIG. 2, now to be considered, is a block diagram of a first illustrative embodiment of the invention. This embodiment of the invention is equally adapted to either predistortion or postdistortion compensation of an active device; that is, the circuit of the invention may be located at either the input or the output of the active device. The transmission signal is applied to signal coupler 12. Most of the signal from signal coupler 12 appears at delay line 13, while only a small portion of the signal is coupled to compensation circuit 14 through attenuator 16.

The signal coupler 12 comprises a device known to those in the art as a resolver. The resolver 12 provides two output signals differing in phase from each other. This phase difference remains constant over a given frequency band. For purposes of the invention, this frequency band should, at least, be coextensive with the signal bandwidth of the signal being transmitted. The resolver 12 comprises a quadrature hybrid 1 connected through attenuators 2 and 3 to a 180° hybrid junction power splitter 4. As is known to those in the art, the values of attenuators 2 and 3 determine the value of constant phase difference that will be maintained between the signals applied to delay line 13 and to compensation circuit 14. The remaining port of quadrature hybrid 1 is connected to an impedance termination 5.

The compensation circuit 14 comprises a hybrid junction splitter 17 which delivers an output signal to a delay line 18 and another output signal to a squarer 19 through respective attenuators 21 and 22. The two output signals of splitter 17 are in phase with each other. The squarer 19 may be realized by a balanced frequency doubler which provides a squared, or second order, output signal from its input signal. The second order output signal passes through an amplifier 23 and a high-pass filter 24 and is then applied to a multiplier 26. The multiplier 26 takes this second order output signal and multiplies it with the other input signal to multiplier 26, derived from delay line 18, to provide a third order output signal. The third order signal is then amplified by an amplifier 27 and applied to an attenuator 28.

The filter 24 serves to pass the band of second order harmonic frequencies and a block the baseband components. The delay lines 13 and 18 may comprise short lengths of coaxial cable. The delay 13 should be equal to the delay encountered by the signal traversing compensation circuit 14, while the delay 18 should be equal to the delay encountered by a signal in the path comprising squarer 19.

The phase and amplitude of the third order signal obtained from attenuator 28 are adjusted by a variable phase shifter or phase control 29 and a variable attenuator 31. The adjusted third order signal and the transmission signal from the delay line 13 are then combined by hybrid coupler 30 to produce an output transmission signal. In the case of predistortion compensation, this output transmission signal is predistorted for application to the input of the active device sought to be compensated. After the signal then passes through the active device the output therefrom will be free of third order nonlinear distortion effects. Alternatively, the invention can provide postdistortion compensation. In this case, the input transmission signal to coupler 30 contains distortion. This distortion is then compensated and the output signal of coupler 30 is virtually free of third order distortion.

In operation, the transmission signal is applied to resolver 12 and passes through delay line 13 to hybrid coupler 30. The resolver 12 extracts a portion of the transmission signal and aplies it to compensation circuit 14. The compensation circuit 14 performs its multiplying function to produce a third order signal. This third order signal then has its amplitude and phase adjusted before being coupled with the transmission signal in hybrid coupler 30. Attenuator 31 is adjusted so that the amplitude of the compensating signal, or third order signal, is of the same level as the distortion introduced by the active device, which may be connected to either the input or output of FIG. 2. The attenuators 2 and 3 of resolver 12 are chosen to provide a given initial phase difference between its two output paths. The phase control 29 then permits a precise phase adjustment so as to achieve an exact complementary phase relationship between the compensating signal and the third order distortion of the active device.

Figure 3:
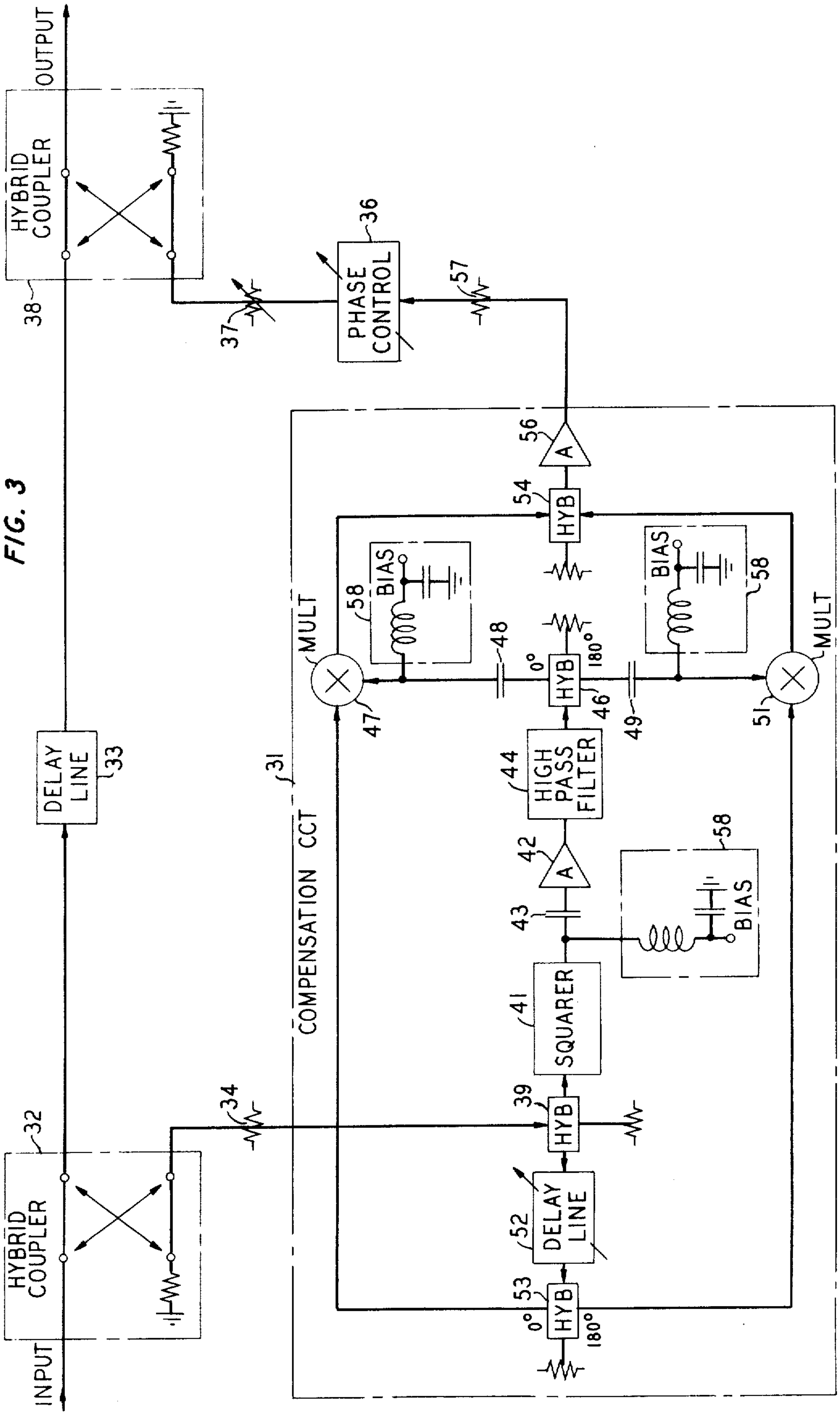
FIG. 3 is a distortion compensation circuit utilizing balanced circuitry to derive the distortion cancelling signal.

FIG. 3 is an embodiment of the present invention wherein a pair of multipliers is connected in a balanced configuration in compensation circuit 31. The transmission signal is applied to a quadrature hybrid 32, which delivers most of the transmission signal to a delay line 33 and the remaining small portion of the transmission signal via an attenuator 34 to compensation circuit 31. The two output signals of hybrid 32 have a phase difference of 90 degrees. It should be understood, however, that in certain applications particularly involving wideband transmission signals, it may be desirable to replace hybrid 32 with a resolver. The latter makes it possible to maintain the required complementary phase difference between its output signals over a wider frequency range than quadrature hybrid 32. The compensation circuit 31, which will be considered in detail hereinafter, generates the third order signal. This third order signal then has its phase and amplitude adjusted, respectively, by a variable phase shifter or control 36 and a variable attenuator 37. These two adjustments yield the proper phase and amplitude for the third order output signal relative to the third order distortion introduced by the active device. The adjusted third order signal and the transmission signal from delay line 33 are then combined by hybrid 38 to produce, for example, a predistorted transmission signal. The predistorted transmission signal thus effectively compensates for the distortion introduced by the active device through complementary cancellation. The delay line 33 equalizes the delay in the path of the transmission signal to that of the delay introduced by compensation circuit 31 in generating the third order signal. Similar to the circuit of FIG. 2, the circuit of FIG. 3 is equally adapted to provide either predistortion or postdistortion compensation; that is, it may be connected to the input or output of the active device being compensated.

In compensation circuit 31, the transmission signal is applied to a hybrid 39 which divides the signal into two equal components that are in-phase with each other. The first signal component is applied to a squarer 41, which produces a second order signal. This second order signal is then applied to amplifier 42 via a dc blocking capacitor 43. The second order output signal passes through the highpass filter 44 to another hybrid 46. The highpass filter 44 passes the band of second harmonic frequencies of the input signal and attenuates, or stops, the baseband signal. Hybrid 46 divides the second order signal into two equal components that have a phase difference of 180 degrees. One second order component is applied to a multiplier 47 via a capacitor 48, while the other component is applied through a capacitor 49 to multiplier 51. Both capacitors serve as dc blocking capacitors.

From the other output port of hybrid 39, the other transmission signal component is applied to a variable delay line 52, which supplies the input signal to hybrid 53. Hybrid 53 divides this signal into two equal components 180° out-of-phase with each other. The first component is applied to multiplier 47, while the second is applied to multiplier 51. Both multipliers serve to produce third order output signals. The function of variable delay 52 is to make the delay in applying the transmission signal components to the two multipliers equal to the delay encountered in generating the second order signals that are applied to the two multipliers via hybrid 46.

It should be noted that the two input signals to multiplier 51 are 180° out-of-phase with the respective inputs to multiplier 47. The effect of this relative phase difference upon multiplier operation will now be considered. Multiplier 51 produces an output signal that is phase shifted an additional 180° so that its output, in effect, is shifted relatively a total of 360 degrees [$180° + 180° = 360° \approx 0°$] or back into phase with the output of multiplier 47. As a result, hybrid 54 adds these two input signals in-phase to produce a single third order output; and perhaps more importantly, any unwanted portion of the input signals to the multipliers which feed through to their outputs are 180 degrees out-of-phase and therefore cancel each other out in hybrid 54. The third order output signal from hybrid 54 is applied to amplifier 56 whose output is then supplied via attenuator 57 to variable phase control 36.

In addition to the difference in configuration between the compensation circuits of FIGS. 2 and 3, it should be noted that squarer 41 and multipliers 47 and 51 are biased through decoupling circuits 58. These components utilize Schottky barrier diodes which require bias to operate at low-signal levels. In addition, the bias must be chosen to set the zero signal operating point in the center of the square-law region of the Schottky barrier diode so that the device operates as a pure multiplier over the largest possible dynamic range of signal levels.

Figure 4A:
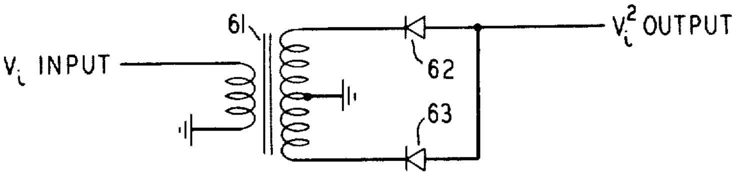
FIGS. 4A and 4B are circuit diagrams, respectively, of the squarer and multiplier components utilized in FIGS. 2 and 3.
Figure 4B:
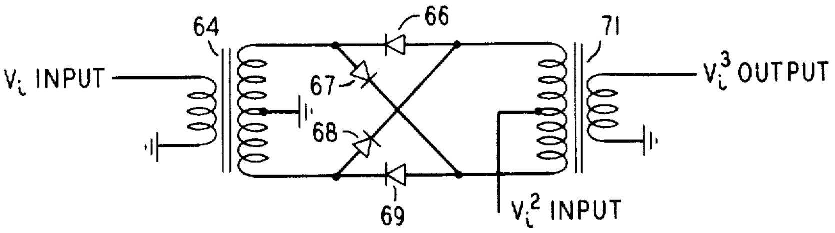

FIGS. 4A and 4B are respective circuit diagrams of a balanced squarer and of a balanced multiplier. These two circuits can be used to realize the functions of the squarers and multipliers in FIGS. 2 and 3.

In FIG. 4A the input signal $V_i$ is applied to transformer 61, which drives diodes 62 and 63. These diodes perform the multiplication to provide a second order output signal, $V_i^2$.

In FIG. 4B the input signal $V_i$ is applied to transformer 64, which drives a diode bridge or a diode ring quad circuit. The diode ring quad comprises diodes 66, 67, 68 and 69. The transformer 71 is also connected to the diode ring quad. The second order input signal $V_i^2$ is applied to the center tap of transformer 71. The diode ring quad multiplies the input signal $V_i$ by the input signal $V_i^2$ to produce the third order output signal $V_i^3$.

Figure 4C:
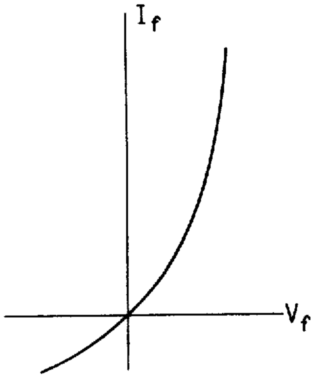
FIGS. 4C and 4D depict the characteristics of particular diode devices that are employed in these latter components.
Figure 4D:
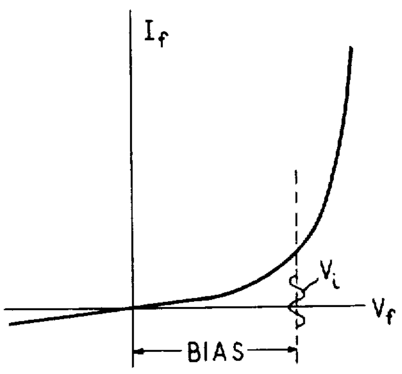

FIGS. 4C and 4D are respective characteristics of a back diode and a Schottky barrier diode. Our use of back diodes is particularly advantageous in that there is no external bias potential required for operation in the square-law portion of its characteristics.

The back diode, like the tunnel diode, is basically a small signal device which is useful when dealing with small-amplitude waveforms. This is not a disadvantage since the input signals available are also low-level signals. In addition, the square-law characteristics, necessary for pure multiplication over a dynamic range are obtained only with low-level signals in nonlinear devices.

Essential requirements of the back diode, used in this application, are that the I.V. Characteristic be chosen to provide sufficient square-law output current over the required dynamic range and to obtain the diode impedance required for input impedance matching. Also, it is essential that the quad or pair of diodes be selected to have identical, as possible I.V. characteristics to prevent input signal frequencies from appearing at the output port. A typical commercial back diode that can be used in this application is the BD-4 diode made by the General Electric Company.

The use of low-signal levels makes it necessary that the third order output signal of the multiplier in the compensation circuit be amplified before it is used to provide compensation.

As previously mentioned, Schottky barrier diodes may also be used in the circuits of the squarer and the multiplier. Again, low-level signals are desirable to provide a sufficient dynamic operating range for effective compensation. Thus, the Schottky barrier diodes are biased so that the low-level signal is applied to the square-law region of the diode characteristic. This operation is depicted in FIG. 4D. The bias potential in the case of the squarer is applied to the output terminal. The bias potential does not affect the balance of the circuit since both diodes are biased in the same direction. In the multiplier, the bias is applied to the $V_i^2$ input terminal. However, because of the circuit configuration, two diodes are biased in a reverse direction from the same bias potential that is required to bias two diodes in the forward direction. Consequently, the balanced symmetry of the circuit is somewhat deleteriously affected and feedthrough of the input signals is increased. To eliminate the effect of the feedthrough signals, a pair of multipliers using Schottky barrier diodes is operated in a balanced configuration as shown in FIG. 3. Individual adjustment of the bias potential of each multiplier allows the feedthrough signal components of one of the multipliers to be made equal to the feedthrough signal components of the other multiplier. Thus, due to the complementary phase relationship of the feedthrough components, they cancel each other out in hybrid 54.

It may at times be desirable to control the amplitude and phase of the third order distortion compensating signal automatically; for example, in those applications where the active device being compensated introduces distortion that tends to change as the device ages. Once the distortion of such an active device exceeds a prescribed level, the amplitude and phase can be controlled automatically by conventional feedback control means, to increase the effectiveness of the compensation and reduce the overall distortion to an insignificant level. In certain other instances, the distortion compensation techniques of the invention may be utilized to compensate for other given orders of distortion; e.g., second, fourth or fifth orders of distortion.

It is to be understood that the distortion compensation circuits disclosed in the foregoing are intended to merely represent illustrative embodiments of the principles of the invention. In other applications, for example, additional multipliers might be utilized in distortion compensation circuits to eliminate distortion higher than the third order. Also, in certain applications (carrier equipment) it may be desirable to eliminate second order distortion. This can be accomplished using only a squarer with suitable gain and phase control equipment. In other further applications, a plurality of orders of distortion may be individually compensated by a plurality of separately operated compensation circuits. Accordingly, it must be understood that various changes and modifications of the distortion compensation circuitry disclosed herein may occur to those skilled in the art without departing from the spirit and scope of the invention.

What is claimed is:

1. A distortion compensating circuit for a signal path subject to distortion comprising:

means for extracting a portion of the signal in said signal path;

squaring means for operating on a portion of the extracted signal to produce a second order output signal;

multiplier means connected to receive said second order output signal and a portion of the extracted signal and for multiplying the same to produce a third order output signal;

means for adjustably controlling the phase and amplitude of said third order output signal to provide a compensating signal having a complementary phase relationship with and an amplitude substantially equal to third order distortion effects present in said signal path;

means for coupling the compensating signal to said signal path to substantially eliminate said third order distortion effects from said signal path; and means for eliminating feedthrough signal components from the compensation signal coupled back into said signal path.

2. The distortion compensating circuit of claim 1 wherein the extracting means comprises a resolver for providing a predetermined phase shift between the signal in said signal path and the signal energy extracted therefrom, said phase shift being substantially constant over the frequency band and dynamic range of the signal in said signal path.

3. The distortion compensating circuit as defined in claim 1 comprising first means for equally dividing the second order ouput signal into first and second components shifted 180° from each other, second means for equally dividing a portion of the extracted signal into first and second components shifted 180° from each other, a first multiplier connected to receive the first components from the first and second dividing means, a second multiplier connected to receive the second components from the first and second dividing means, said first and second mutlipliers providing third order output signals by multiplying their respective input signals together, and signal combining means for adding the third order output signals from said first and second multipliers in phase to produce a single third order output signal, said signal combining means serving to eliminate those unwanted portions of the multiplier input signals that feed through to the outputs of said first and second multipliers.

4. The distortion compensating circuit as defined in claim 3 wherein said first and second multipliers each comprise Schottky barrier diodes connected in a ring quad circuit and biasing means connected to each of said ring quad circuits, said biasing means supplying a low potential for operating said Schottky barrier diodes in the square-law region of their characteristics, the respective biasing means for each multiplier being individually adjustable to make these portions of the input signals that feed through said first multiplier equal to the feedthrough components of said second multiplier so as to cancel each other out in said signal combining means.

5. A distortion compensating circuit for a signal path subjecting a transmission signal to distortion comprising:

means for extracting a part of the transmission signal in said signal path to supply first and second portions of the same;

squaring means for operating on said first portion of the extracted transmission signal to produce a second order output signal;

filtering means connected to receive said second order output signal, said filtering means passing the second order harmonic frequencies of said transmission signal while blocking the fundamental frequency components of said transmission signal;

delaying means for introducing a propagation delay to said second portion of the extracted transmission signal;

multiplier means connected to receive the output of said filtering means and the delayed second portion of the extracted signal, said multiplier means comprising a balanced configuration of back diodes connected in a quad ring, said back diodes multiplying together the signals applied to said multiplier means to produce a third order output signal;

means for delaying the transmission signal in said signal path an interval corresponding to the propagation delay of the extracted transmission signal in traversing its signal path to produce said third order output signal;

means for adjustably controlling the phase and amplitude of said third order output signal to provide a compensating signal having a complementary phase relationship with and an amplitude substantially equal to the third order distortion effects introduced to said transmission signal by said signal path; and means for coupling the compensating signal to the delayed transmission signal of said signal path to substantially eliminate said third order distortion effects introduced by said signal path to produce an output transmission signal virtually free of same.

* * * * *

UNITED STATES PATENT OFFICE
CERTIFICATE OF CORRECTION

Patent No. 3,825,843 Dated July 23, 1974

Inventor(s) Robert Irving Felsberg and Hotze Miedema

It is certified that error appears in the above-identified patent and that said Letters Patent are hereby corrected as shown below:

In column 3, line 25, --. . .-- should be added at the end of Equations (1) and (2).

In column 3, line 40, --...,-- should be added at the end of Equation (3).

In column 3, line 45, --....-- should be added at the end of Equation (4).

In column 4, line 44, "a" should read --to--.

In column 5, line 4, "aplies" should read --applies--.

Signed and sealed this 8th day of October 1974.

(SEAL)
Attest:

McCOY M. GIBSON JR.
Attesting Officer

C. MARSHALL DANN
Commissioner of Patents